(12) United States Patent
Kim et al.

(10) Patent No.: US 9,495,720 B2
(45) Date of Patent: Nov. 15, 2016

(54) METHOD AND APPARATUS FOR COMPILING AND EXECUTING AN APPLICATION USING VIRTUALIZATION IN A HETEROGENEOUS SYSTEM

(75) Inventors: Kyoung Hoon Kim, Suwon-si (KR); In Choon Yeo, Suwon-si (KR); Seung Wook Lee, Suwon-si (KR); Joong Baik Kim, Seocho-gu (KR); Il Ho Lee, Suwon-si (KR); Jeong Ig Song, Seoul (KR)

(73) Assignee: Samsung Electronics Co., Ltd (KR)

( * ) Notice: Subject to any disclaimer, the term of this patent is extended or adjusted under 35 U.S.C. 154(b) by 834 days.

(21) Appl. No.: 13/245,255

(22) Filed: Sep. 26, 2011

(65) Prior Publication Data

US 2012/0075316 A1    Mar. 29, 2012

(30) Foreign Application Priority Data

Sep. 27, 2010  (KR) .......................... 10-2010-0093327

(51) Int. Cl.
    *G06T 1/00*     (2006.01)
    *G06T 1/20*     (2006.01)
    *G06T 15/00*     (2011.01)
    *G06F 9/45*     (2006.01)

(52) U.S. Cl.
    CPC . *G06T 1/20* (2013.01); *G06F 8/48* (2013.01); *G06T 15/005* (2013.01)

(58) Field of Classification Search
None
See application file for complete search history.

(56) References Cited

U.S. PATENT DOCUMENTS

| 5,794,062 | A | 8/1998 | Baxter | |
| 7,430,670 | B1 * | 9/2008 | Horning et al. | 713/190 |
| 2002/0133810 | A1 * | 9/2002 | Giles et al. | 717/138 |
| 2005/0044301 | A1 * | 2/2005 | Vasilevsky et al. | 711/1 |
| 2008/0184211 | A1 * | 7/2008 | Nickolls et al. | 717/140 |
| 2009/0064095 | A1 * | 3/2009 | Wallach et al. | 717/106 |
| 2009/0070553 | A1 | 3/2009 | Wallach et al. | |
| 2009/0300645 | A1 * | 12/2009 | Devine et al. | 718/107 |

FOREIGN PATENT DOCUMENTS

| CN | 101231585 | 7/2008 |
| CN | 101599009 | 12/2009 |
| JP | 10-320214 | 12/1998 |

(Continued)

OTHER PUBLICATIONS

Bakhoda, Ali, et al. "Analyzing CUDA workloads using a detailed GPU simulator." Performance Analysis of Systems and Software, 2009. ISPASS 2009. IEEE International Symposium on. IEEE, 2009.*

(Continued)

*Primary Examiner* — Sultana M Zalalee
(74) *Attorney, Agent, or Firm* — The Farrell Law Firm, P.C.

(57) ABSTRACT

A method and apparatus for compiling and executing an application including Central Processing Unit (CPU) source code and Graphic Processing Unit (GPU) source code. The apparatus includes a hardware device including a CPU and a GPU; a compiler that compiles the GPU source code into a GPU virtual instruction; and a hybrid virtualization block that executes an execution file by translating the GPU virtual instruction into GPU machine code.

21 Claims, 15 Drawing Sheets

(56) References Cited

FOREIGN PATENT DOCUMENTS

| JP | 2008-276740 | 11/2008 |
|---|---|---|
| WO | WO 2009/029698 | 3/2009 |

OTHER PUBLICATIONS

Ryoo, Shane, et al. "Program optimization space pruning for a multithreaded gpu." Proceedings of the 6th annual IEEE/ACM international symposium on Code generation and optimization. ACM, 2008.*

Mark et al., "CG: A System for Programming Graphics Hardware in a C-like Language", Proceedings of ACM SIGGRAPH 2003, vol. 22, No. 3, Jul. 3, 2003.

Rolles, "Unpacking Virtualization Obfuscators", Proceedings of the 3rd USENIX Workshop on Offensive Technologies, 2009.

Chafi et al., "Language Virtualization for Heterogeneous Parallel Computing", Proceedings of the ACM International Conference on Object Oriented Programming Systems Languages and Applications, vol. 45, No. 10, Oct. 2010.

Chinese Office Action dated Nov. 4, 2014 issued in counterpart application No. 201180046553.5.

The CUDA Compiler Driver NVCC, NVIDIA Corporation, Apr. 24, 2008, 31 pages.

Kenji Okada, "Introduction to CUDA High-Speed GPU Programming", 1st Edition, Mar. 25, 2010, 9 pages.

John. R. Levine, "Linkers & Loaders", 1st Edition, Sep. 25, 2001, 24 pages.

Japanese Office Action dated Dec. 7, 2015 issued in counterpart application No. 2013-531479, 8 pages.

Ali Bakhoda et al., "Analyzing CUDA Workloads Using a Detailed GPU Simulator", Performance Analysis of Systems and Software, IEEE International Symposium, 2009, 12 pages.

Korean Office Action dated Jul. 18, 2016 issued in counterpart application No. 10-2010-00933327, 14 pages.

* cited by examiner

FIG. 4 (Prior Art)

```
#include <OpenCL/opencl.h>
// kernel function for square operation
const char *KernelSource = "\n" \
"__kernel square ( __global float* input, __global float* output, const unsigned int count) \n" \
"{                                                          \n" \
"   int i = get_global_id(0);                               \n" \
"   if(i <count)                                            \n" \
"       output[i] = input[i] * input[i];                    \n" \
"}                                                          \n" \
"\n";
int main(int argc, char** argv)
{
    size_t global;                  // global work size
    size_t local;                   // local work size
    cl_device_id device_id;         // compute device id
    cl_context context;             // compute context
    cl_command_queue commands;      // compute command queue
    cl_program program;             // compute program
    cl_kernel kernel;               // compute kernel
    cl_mem input;                   // device memory used for the input array
    cl_mem output;                  // device memory used for the output array
    for(i = 0; i < count; i++)
        data[i] = rand() / (float)RAND_MAX;
    // Compute device connection
    err = clGetDeviceIDs(NULL, CL_DEVICE_TYPE_GPU, 1, &device_id, NULL);
    // Context creation
    context = clCreateContext(0, 1, &device_id, NULL, NULL, &err);
    // Command queue creation
    commands = clCreateCommandQueue(context, device_id, 0, &err);
    // Program object creation
    program = clCreateProgramWithSource(context, 1, (const char **) & KernelSource, NULL, &err);
    // Program build (compile &link)
    err = clBuildProgram(program, 0, NULL, NULL, NULL, NULL);
    // Kernel object creation
    kernel = clCreateKernel(program, "square", &err);
    // Create memory object in device memory
    input = clCreateBuffer(context, CL_MEM_READ_ONLY, sizeof(float) * count, NULL, NULL);
    output = clCreateBuffer(context, CL_MEM_WRITE_ONLY, sizeof(float) * count, NULL, NULL);
    // Write data to input array of device memory
    err = clEnqueueWriteBuffer(commands, input, CL_TRUE, 0, sizeof(float) * count, data, 0, NULL,..);
    // Generate argument value for kernel execution
    err  = clSetKernelArg(kernel, 0, sizeof(cl_mem), &input);
    err |= clSetKernelArg(kernel, 1, sizeof(cl_mem), &output);
    err |= clSetKernelArg(kernel, 2, sizeof(unsigned int), &count);
    // Kernel execution
    err = clEnqueueNDRangeKernel(commands, kernel, 1, NULL, &global, &local, 0, NULL, NULL);
    // Wait until all the previous commands in command queue are executed
    clFinish(commands);
    // Read calculation result of device to host
    err = clEnqueueReadBuffer( commands, output, CL_TRUE, 0, sizeof(float) * count, results, 0,..);
    // Shutdown and cleanup
    clReleaseMemObject(input);
    clReleaseProgram(program);
    clReleaseKernel(kernel);
    clReleaseCommandQueue(commands);
    clReleaseContext(context);
    return 0;
}
```

METHOD AND APPARATUS FOR COMPILING AND EXECUTING AN APPLICATION USING VIRTUALIZATION IN A HETEROGENEOUS SYSTEM

PRIORITY

This application claims priority under 35 U.S.C. §119(a) to an application filed in the Korean Intellectual Property Office on Sep. 27, 2010, and assigned Serial No. 10-2010-0093327, the content of which is incorporated herein by reference.

BACKGROUND OF THE INVENTION

1. Field of the Invention

The present invention relates generally to a method and apparatus for compiling and executing an application with virtualization in a heterogeneous system integrating Central Processing Unit (CPU) and Graphic Processing Unit (GPU), and more particularly, to a method and apparatus for compiling and executing the application by compiling a GPU source code of the application into a GPU virtual instruction in a source code compiling process and translating the compiled GPU virtual instruction into a GPU machine code in a file execution process.

2. Description of the Related Art

Advances in GPU technology are bringing a number of changes to computing environments. More specifically, conventionally a GPU is a device designed for graphics processing and it has been dealt with as an auxiliary part for mitigating overload of the CPU, as the main part of a computer, when there is little use of graphic content. However, with the widespread popularization of High Definition (HD) video and games, and now even 3-Dimensional (3D) content, the role of the GPU is increasing. That is, the GPU has recently been spotlighted as a unit responsible for processing large volume of operations in place of CPU as well as graphics processing. Accordingly, as the role of GPU is expanded, there is a growing need to improve the utilization efficiency of the GPU.

SUMMARY OF THE INVENTION

Accordingly, the present invention is provided to address the above-mentioned problems and/or disadvantages and to offer at least the advantages described below.

An aspect of the present invention is to provide a method and apparatus for compiling and executing an application using virtualization in a heterogeneous system integrating CPU and GPU.

Another aspect of the present invention to provide a method and apparatus that compiles GPU source code into a GPU virtual instruction when compiling the source codes included in the application and translates the compiled virtual GPU command to a GPU machine code directly, resulting in enhanced CPU and GPU utilization efficiency.

In accordance with an aspect of the present invention, a method for compiling and executing an application in a system including a Central Processing Unit (CPU) and a Graphic Processing Unit (GPU) is provided. The method includes receiving a request for compiling the application, the application including CPU source code and GPU source code; generating an execution file in response to the request for compiling by compiling the GPU source code into a GPU virtual instruction; receiving a request for executing the execution file; and executing the execution file by translating the GPU virtual instruction into GPU machine code, in response to the request for executing the execution file.

In accordance with another aspect of the present invention, an apparatus for compiling and executing an application including Central Processing Unit (CPU) source code and Graphic Processing Unit (GPU) source code is provided. The apparatus includes a hardware device including a CPU and a GPU; a compiler that compiles the GPU source code into a GPU virtual instruction; and a hybrid virtualization block that executes an execution file by translating the GPU virtual instruction into GPU machine code.

In accordance with another aspect of the present invention, an apparatus for compiling and executing an application including Central Processing Unit (CPU) source code and Graphic Processing Unit (GPU) source code is provided. The apparatus includes a hardware device including a CPU and a GPU; a compiler that compiles the GPU source code into a GPU virtual instruction; and an Operating System (OS) for executing an execution file by translating the GPU virtual instruction into GPU machine code.

BRIEF DESCRIPTION OF THE DRAWINGS

The above and other aspects, advantages, and salient features of certain embodiments of the present invention will become apparent to those skilled in the art from the following detailed description, when taken in conjunction with the accompanying drawings, in which:

FIG. 4 illustrates an exemplary code of OpenCL® method;

DETAILED DESCRIPTION OF EMBODIMENTS OF THE INVENTION

Various embodiments of the present invention are described in detail below with reference to the accompanying drawings. In the following description, the matters defined in the description are provided to assist a comprehensive understanding of the present invention, and it is obvious to those of ordinary skill in the art that predetermined modifications or changes of the matters described herein can be made without departing from the scope of the invention. The same reference numbers are used throughout the drawings to refer to the same or like parts. Further, detailed descriptions of well-known functions and structures incorporated herein may be omitted to avoid obscuring the subject matter of the present invention.

In the following description, the term "application" means an application program of original code or source code before being compiled. For example, the source code can be CPU source code for executing a CPU operation or GPU source code for executing a GPU operation. Additionally, the term "execution file" means a file generated by a compiler when compiling an application.

Basically, a GPU can be used by an application (or application program) in two ways. The first way is for a system program, such as an OS, to provide a library for the application to use. The second way is to include a code to be used by GPU in the application in order for the GPU to directly execute the code in a program runtime.

Figure 1:
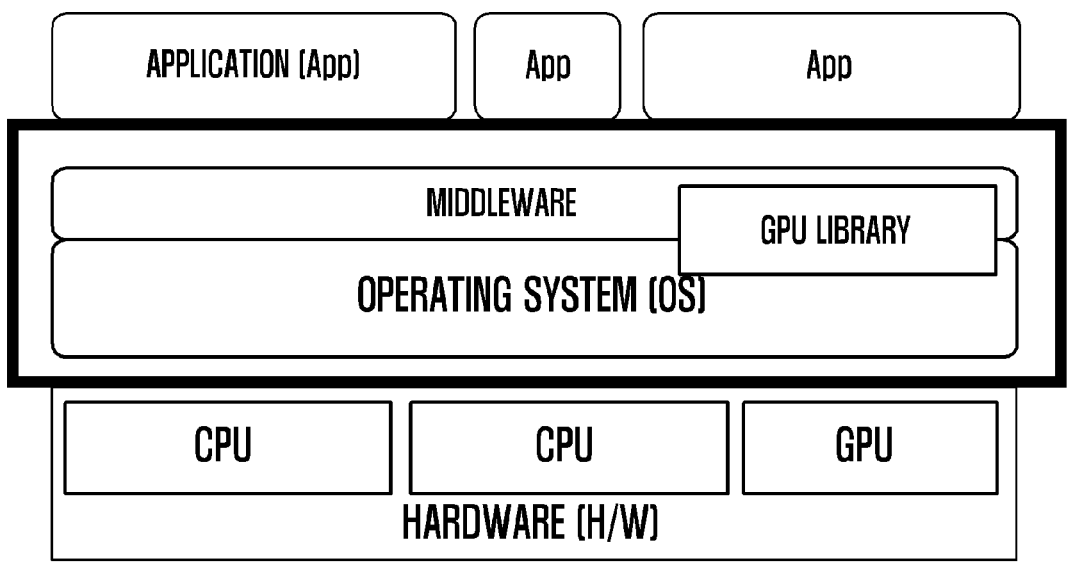
FIG. 1 is a block diagram illustrating a system using a GPU with a library provided by an Operating System (OS)

FIG. 1 is a block diagram illustrating a conventional system using a GPU with a library provided by an OS.

As illustrated in FIG. 1, the system includes an application layer having application programs, a hardware layer including physical processing units, such as a CPU and a GPU, a middleware layer, which is interposed between the application layer and the hardware layer, and an OS. In the system of FIG. 1, the OS provides a GPU library such that the application calls the GPU library directly to perform the corresponding function.

Open Graphics Library (OpenGL®) is a representative graphics standard for use in a system configuration as illustrated in FIG. 1. An application program can call the OpenGL® Application Programming Interface (API) to process 3D graphics with the GPU. The OpenGL® API is a standard API with which the applications are developed. For example, a representative OpenGL®-based application is a game program. However, this type of OpenGL® method has a shortcoming in that only the provided functions can be used.

For example, for implementing face recognition operations using a GPU, a standard face recognition API should be designated and implemented in a corresponding system in the form of a library. However, if the library for the face recognition operations is not provided, there is no way for the program developer to implement the operations.

Figure 2:
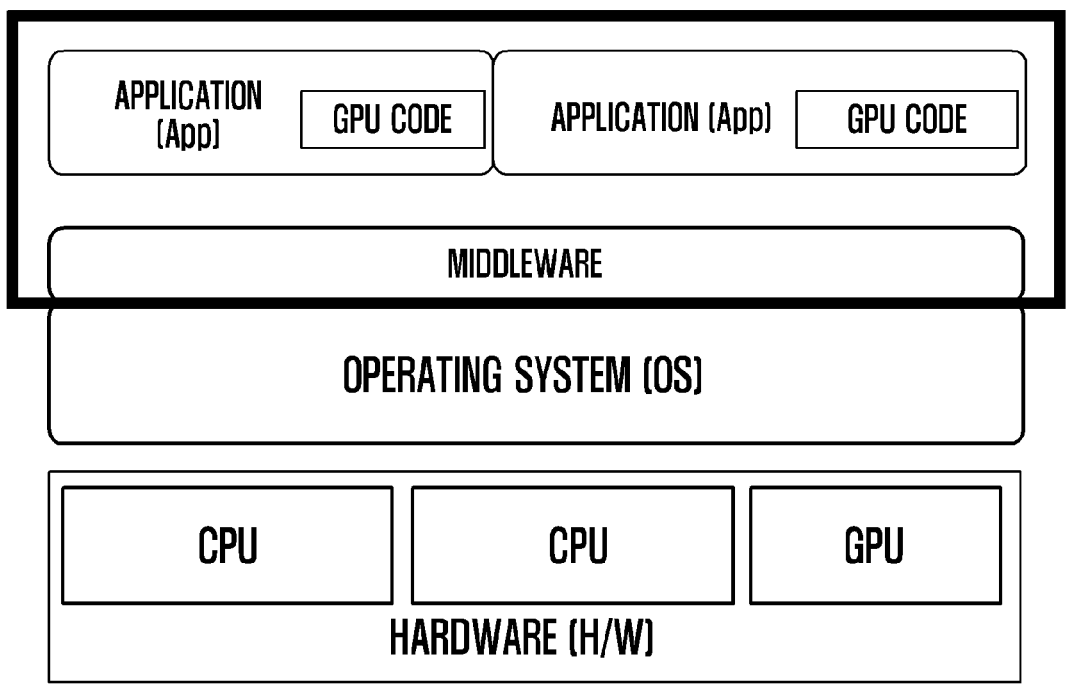
FIG. 2 is a block diagram illustrating a system using a GPU with an inclusion of GPU codes in an application program so as to be executed in a program runtime.

FIG. 2 is a block diagram illustrating a system using a GPU with an inclusion of GPU codes in an application program so as to be executed in a program runtime.

Similar to FIG. 1, the system illustrated in FIG. 2 includes an application layer having application programs, a hardware layer including physical processing units, such as a CPU and a GPU, a middleware layer, which is interposed between the application layer and the hardware layer, and an OS. However, the system illustrated in FIG. 2 differs from the system illustrated in FIG. 1 in that a GPU code for driving the GPU is directly inserted into the application. For example, OpenCL® is a representative graphics standard for use in a system configuration as illustrated in FIG. 2.

Figure 3:
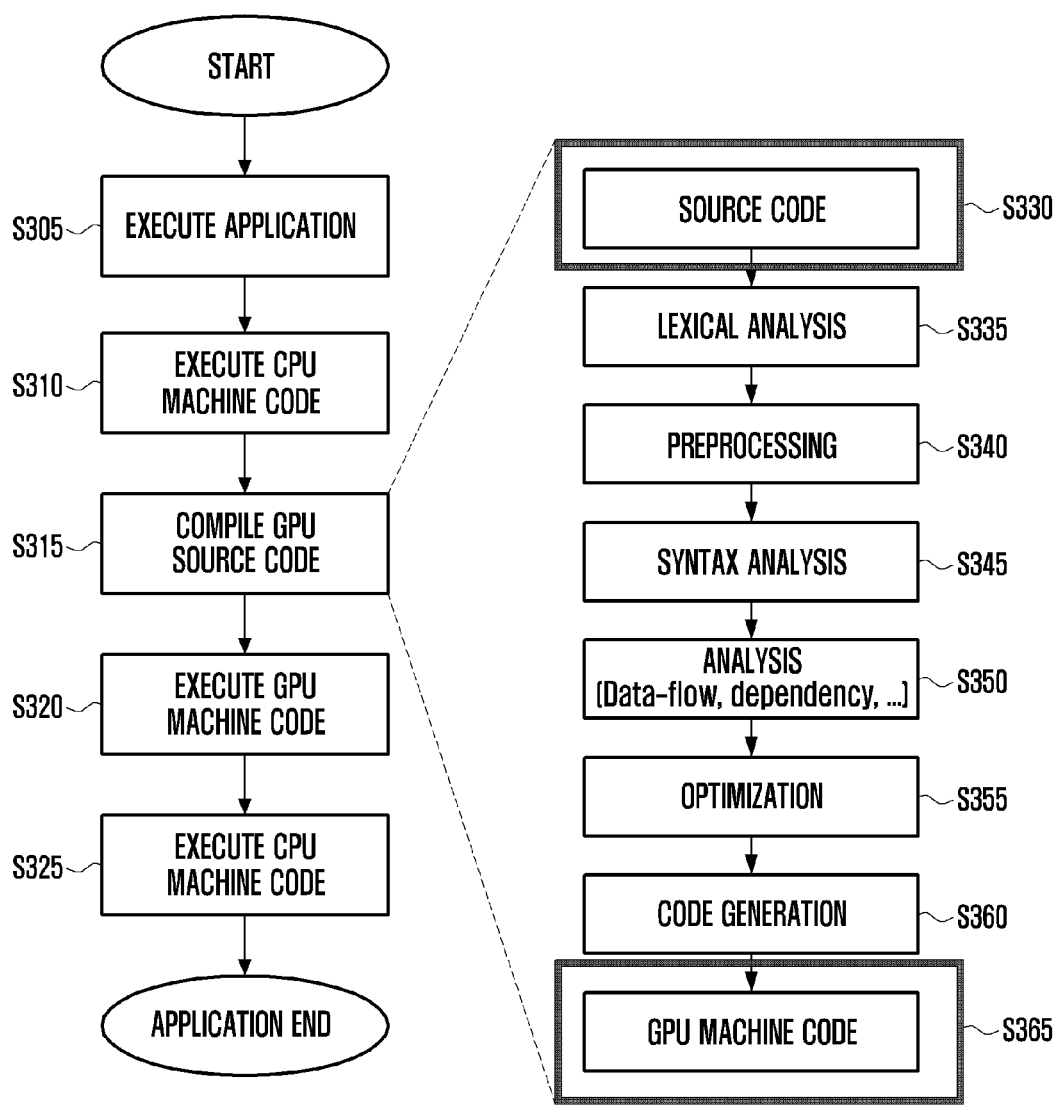
FIG. 3 is a flowchart illustrating an application program execution procedure of Open Computing Language (OpenCL®)

FIG. 3 is a flowchart illustrating an application program execution procedure of OpenCL®.

Referring to FIG. 3, the application program is executed in step S305. Herein, the expression "application is executed" means that an execution file, which is generated by compiling the application, is run.

In step S310, a CPU machine code of the execution file is executed. If the GPU is to be used while running the execution file, the code for the GPU is compiled at the source code level. In step S320, a GPU machine code created as a compiling result is executed. After the completion of the GPU machine code execution, the CPU machine code is executed again in step S325.

The GPU source code compiling process in step S315, is illustrated in more detail in steps S330-S365, on right part of FIG. 3.

Specifically, once the GPU source code compile is initiated in step S330, the GPU machine code is generated via lexical-syntax analysis in step S335, preprocessing in step S340, syntax analysis in step S345, other analysis in step S350, optimization in step S355, code generation in step S360, and GPU machine code creation in step S365. This method is advantageous in that the corresponding GPU source code can be executed by the GPU, regardless of the GPU type (manufacturer). In this case, the common GPU source code is distributed to be compiled in the runtime and operate in the format of a certain GPU machine code.

FIG. 4 illustrates an exemplary code of a conventional OpenCL® method.

Referring to FIG. 4, the application includes codes that can be executed by the CPU and the GPU, simultaneously. In this case, the code referred to with "main" is the code executed by CPU, and the code referred to with "KernelSource" is the code executed by GPU.

The code illustrated in FIG. 4 is compiled such that the CPU code part is converted into machine code. However, the GPU code part is inserted in to an execution file in the form of a character string or saved in an external source file without being compiled. As described above, the GPU source code is compiled and executed when the corresponding application program is executed.

Figure 5:
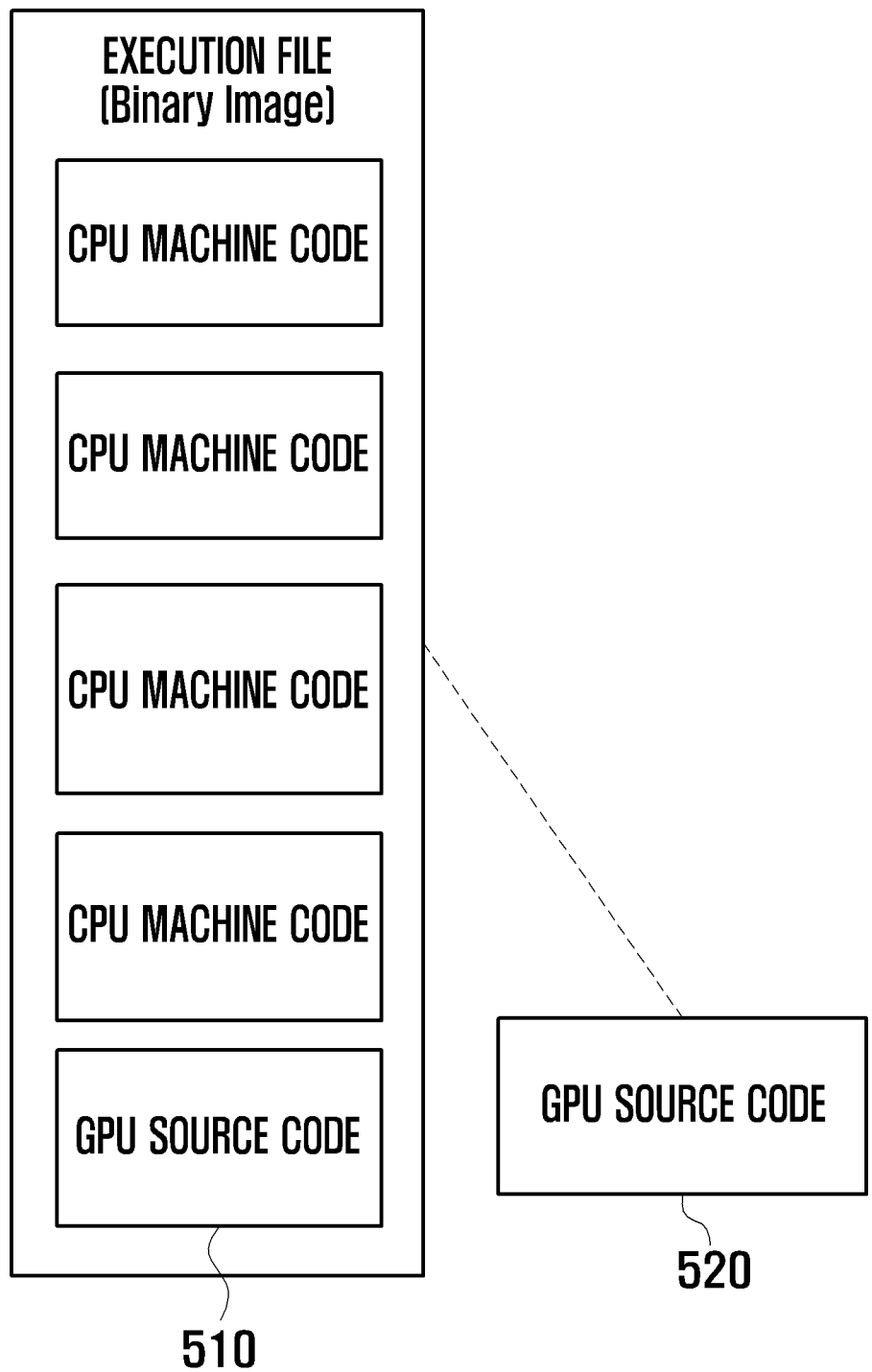
FIG. 5 illustrates an execution file (binary image) executable in an OpenCL® procedure.

FIG. 5 illustrates an execution file (binary image) executable in a conventional OpenCL® procedure.

Referring to FIG. 5, the execution file used in a system as illustrated in FIG. 2, in which the GPU code included in the application program is executed by the GPU in the program runtime, includes metadata such as a header (not shown), CPU machine code, and GPU source code.

As described above, as the role of the GPU is becoming more significant, there is a need for a method for expanding the use of the GPU more freely to overcome the restriction described above, wherein only the standardized API can be used. Accordingly, an aspect of the present invention is to provide an improved method for efficient GPU application use.

More specifically, a conventional technique, such as OpenCL®, has a drawback in that execution speed decreases significantly because a GPU source code is compiled in a program runtime. The compiling operation includes a plurality of intermediate steps and is complex, thereby causing significant problems in an embedded system lacking in computing power.

Further, there is a tradeoff in that the simplification of a process for compiling GPU machine code makes it difficult to generate an optimized GPU machine code, and the optimization of the GPU machine code increases the compiling operation complexity. Also, in a conventional method, such as OpenCL®, the GPU source code 510 is inserted into the data region of the execution file or exists in the form of an external script file, e.g., GPU source code 520, as illustrated in FIG. 5. The exposure of the GPU source to the outside causes potential security problems.

Accordingly, as aspect of the present invention is to provide a method and apparatus for efficiently utilizing a CPU and a GPU and to address the aforementioned problems of the prior art. That is, it is an aspect of the present invention to minimize a time delay caused by complex GPU compiling, to prevent the GPU source code from being exposed, and to provide GPU machine code that can be compiled, regardless of the type of GPU.

For this purpose, the present invention uses a code for GPU operation, which is compiled at an instruction level (or machine code level) rather than at a source code level. In the following description, the GPU source code compiled at instruction level is referred to as a GPU virtual instruction. The GPU virtual instruction is the virtual instruction, other than the machine code executed on the actual GPU hardware. The GPU virtual instruction is binary-translated to a GPU machine code in runtime to be executed. The GPU virtual instruction also can be executed on all the types of GPU hardware.

Because it is compiled into a virtual instruction, the GPU virtual instruction according to an embodiment of the present invention improves the execution speed in runtime and is robust in security.

Figure 6:
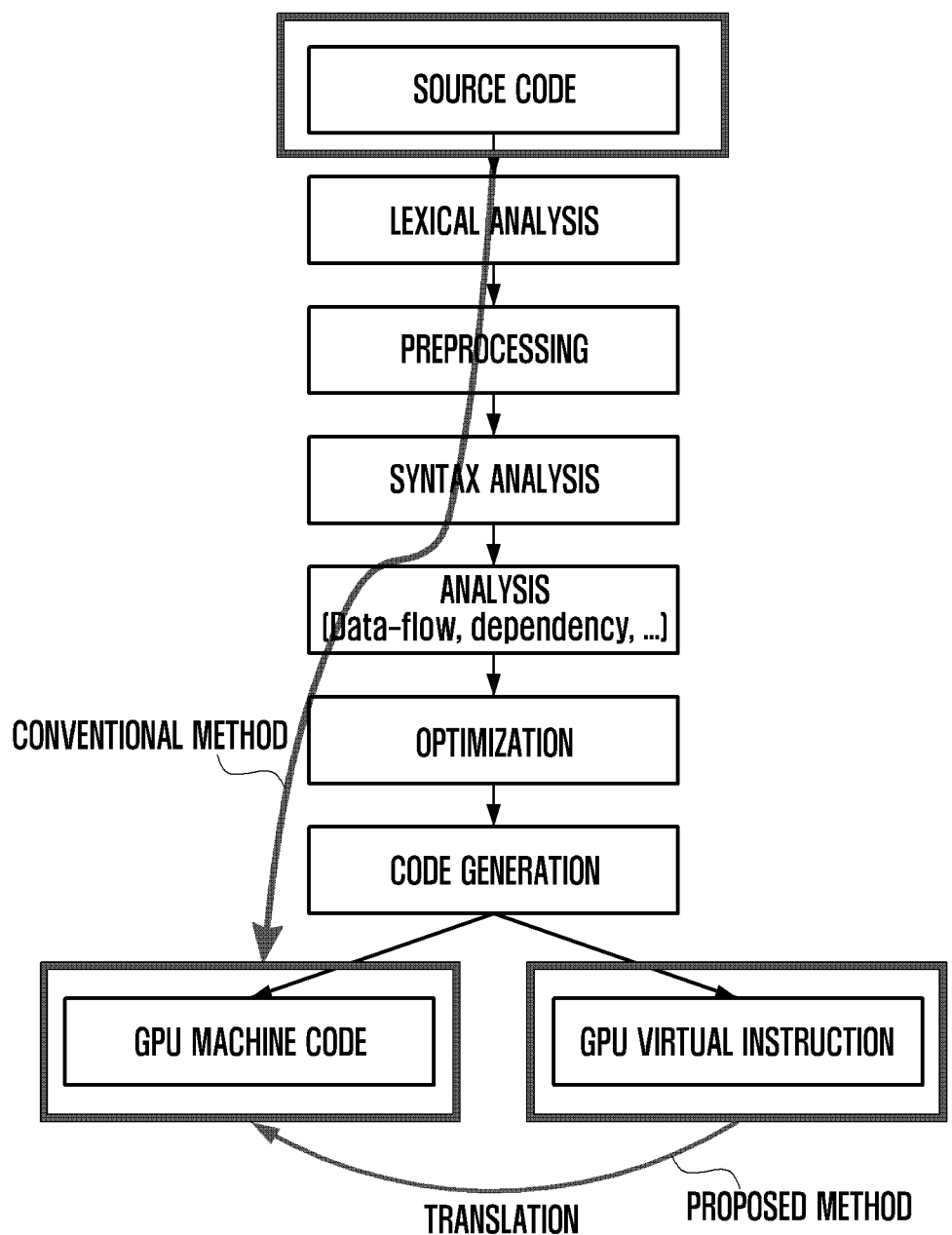
FIG. 6 is a flow diagram illustrating differences between OpenCL® and application execution method according to an embodiment of the present invention.

FIG. 6 illustrates differences between OpenCL® and an application execution method according to an embodiment of the present invention.

As described above, in OpenGL® GPU source code is excluded when compiling the application. During a runtime of the binary image, the source code is compiled via lexical analysis, preprocessing, syntax analysis, and optimization; and GPU machine code, which is a result of the compiling, is then executed.

In accordance with an embodiment of the present invention, however, the GPU source code is compiled into a GPU virtual instruction at an instruction level. The GPU virtual instruction is then translated into a GPU machine code to be executed during a runtime of the execution file.

Unlike the conventional method in which the compiling process is performed from the GPU source code at the time when the GPU source code is executed, a method according to an embodiment of the present invention simplifies the procedure by translating the GPU virtual command, which has been already compiled and translated into a GPU machine code.

Figure 7:
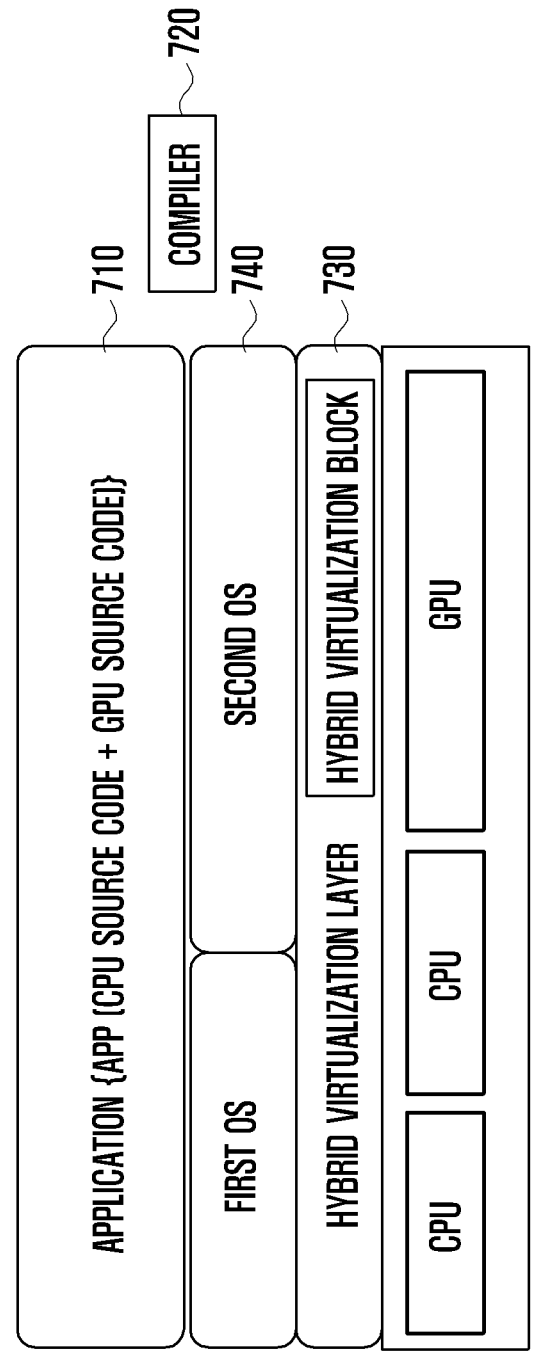
FIG. 7 is a block diagram illustrating a heterogeneous computing system integrating a CPU and a GPU according to an embodiment of the present invention.

FIG. 7 is a block diagram illustrating a heterogeneous computing system integrating a CPU and a GPU according to an embodiment of the present invention.

Referring to FIG. 7, the heterogeneous computing system includes an application 710, a compiler 720, and a hybrid virtualization block 730. The application 710 operates on the application layer and includes both CPU source code and GPU source code. For example, such an application program has been described above with reference to FIG. 4.

The compiler 720 compiles the CPU source code and GPU source code included in the application 710 into a machine code. Here, the compiler 720 compiles the CPU source code into a CPU machine code and compiles the GPU source code into a GPU virtual instruction. Accordingly, the compiler 720 generates an execution file including the CPU machine instruction and GPU virtual instruction. In the following description, the execution file generated as above is referred to as "a hybrid binary image". A hybrid execution file is described in more detail below with reference to FIG. 8.

The hybrid virtualization block 730 is interposed between the application layer and the hardware layer to detect a GPU virtual command during the runtime and translate, when the GPU virtual command is detected, the GPU virtual instruction into GPU machine code. Further, the hybrid virtualization block 730 coordinates the application execution process.

The system illustrated in FIG. 7 includes two different OSs 740 for controlling the overall operations of the system. It should be noted, however, that the number of OSs is not limited to two.

Figure 8:
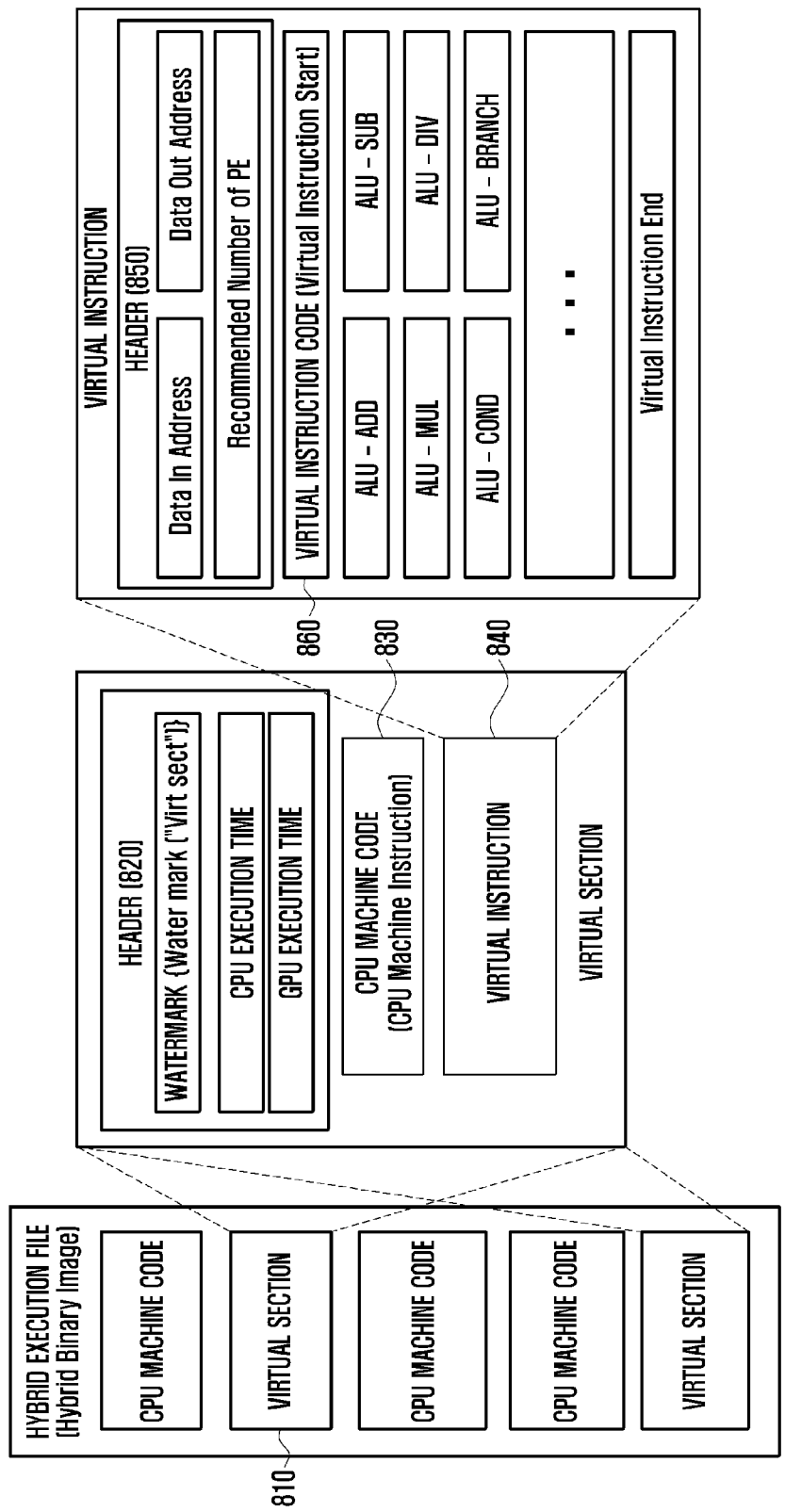
FIG. 8 illustrates a hybrid execution file (binary image) according to an embodiment of the present invention.

FIG. 8 illustrates a hybrid execution file (binary image) according to an embodiment of the present invention.

Referring to FIG. 8, the hybrid execution file includes CPU machine codes and a virtual section 810 including GPU virtual instructions. Here, the GPU virtual section includes a virtual section header 820, a CPU machine code section 830, and GPU virtual instruction 840.

The virtual section header 820 includes a watermark for identifying the virtual section and execution information such as CPU and GPU execution times.

The CPU machine code section 830 includes the CPU machine codes to be executed when the CPU is to execute, e.g., because the system has no GPU or the GPU is busy processing another task.

The GPU virtual instruction region 840 includes instructions to be executed by the GPU. The GPU virtual instruction region 840 includes a virtual instruction header 850 and virtual instruction code 860. The virtual instruction header 850 includes information on addresses of a memory for input and output of the to execute a GPU operation and a number of recommended Processing Elements (PEs). The GPU virtual instruction code includes the virtualized information to be executed by the GPU. That is, the GPU virtual instruction code is the code to be translated into a GPU machine code in the runtime.

Figure 9:
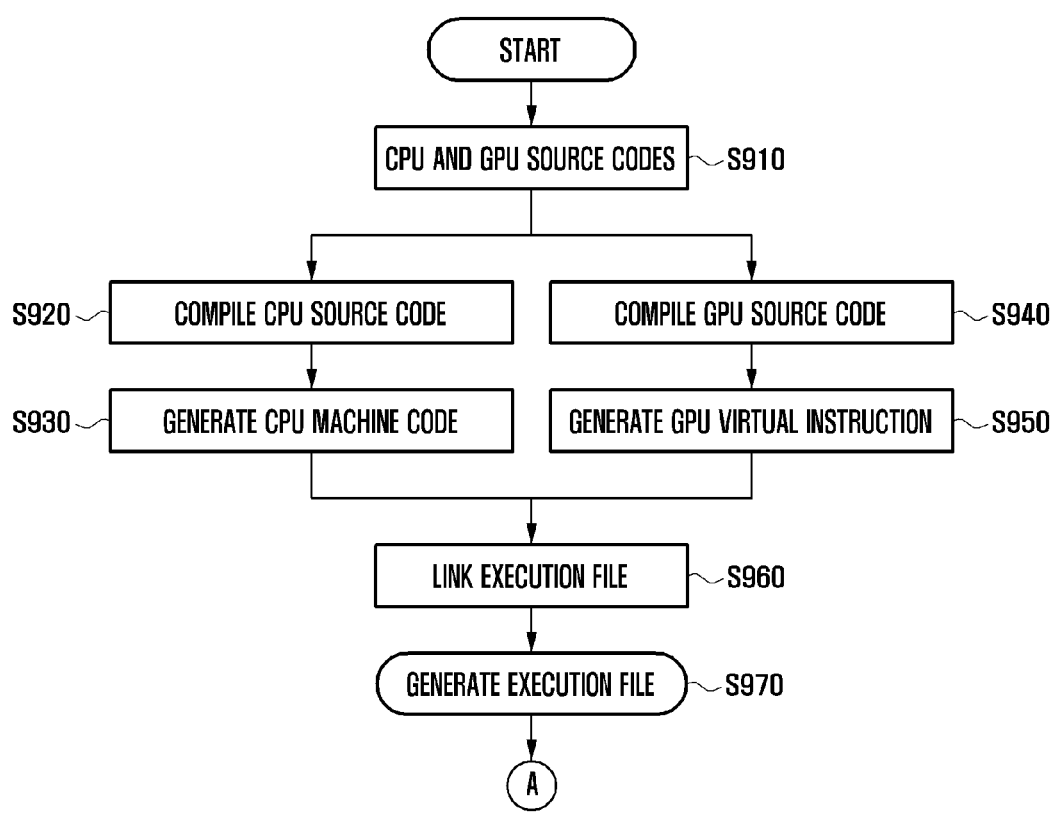
FIG. 9 is a flowchart illustrating a procedure of compiling an application according to an embodiment of the present invention.

FIG. 9 is a flowchart illustrating a procedure for compiling an application according to an embodiment of the present invention.

Referring to FIG. 9, an application including a CPU and a GPU source codes is generated in step S910. When a request for compiling the application is detected, the compiler 720 separately compiles the CPU source code and GPU source code in step S920 and S940, respectively.

More specifically, when a CPU source code is detected, the compiler 720 compiles the CPU source code in step S920 and generates a CPU machine code that is executable by the CPU in step S930. Further, when a GPU code is detected, the compiler 720 compiles the GPU code in step S940 and generates a GPU virtual instruction that is executable by a virtual GPU in step S950. For example, the GPU virtual instruction is structured as illustrated in FIG. 8.

The compiler 720 links the created CPU machine code to the GPU virtual instruction in step S960 and generates a hybrid execution file (binary image) in step S970.

As described above, the hybrid execution file includes CPU machine codes and a virtual section. When the hybrid execution file is executed, the CPU section and the GPU section are executed separately according to the coordination of the virtualization layer, as will be described below with reference to FIG. 10.

Figure 10:
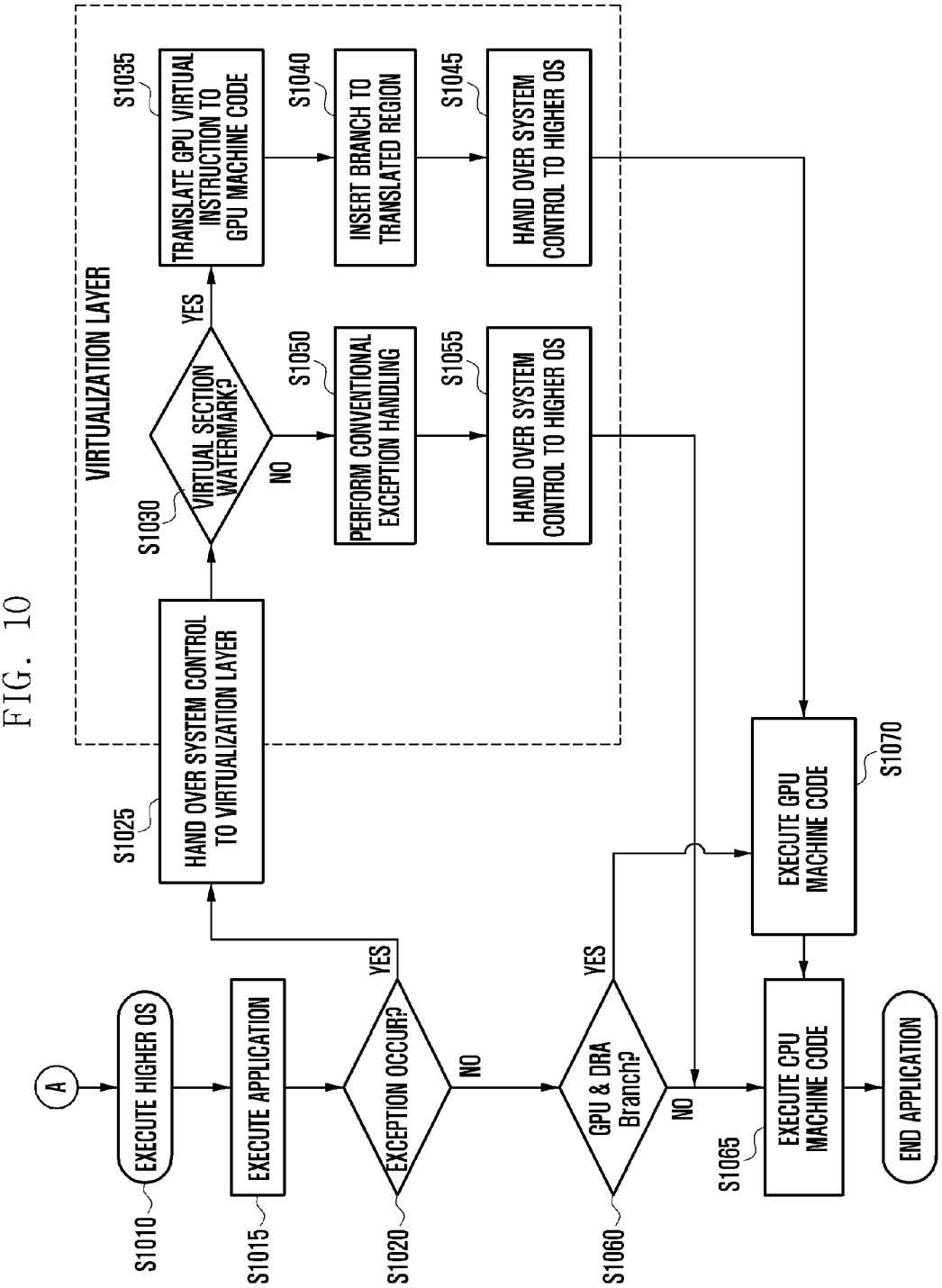
FIG. 10 is a flowchart illustrating a procedure of executing a hybrid execution file by a hybrid virtualization block on a virtualization layer according to an embodiment of the present invention.

FIG. 10 is a flowchart illustrating a procedure for executing a hybrid execution file by a hybrid virtualization block on a virtualization layer according to an embodiment of the present invention.

When the system is organized hierarchically, FIG. 10 assumes that a normal OS is placed on a virtualization layer proposed by an embodiment of the present invention. Further, the hybrid execution file can be executed without the virtualization layer proposed in the present invention as will be described later with reference to FIG. 12.

Referring to FIG. 10, an OS utilizes a system as if only the OS itself is running. First, because the hybrid execution file is normally executed through the OS, the OS is executed first in step S1010. In step S1015, the OS executes the hybrid execution file to which the GPU virtual instruction is inserted. If the virtual section is executed during the execution of the hybrid execution file, an exception occurs in the CPU in step S1020. In step S1025, the control to the system is handed over from the OS to the hybrid virtualization block 730 on the virtualization layer.

The hybrid virtualization block 730 checks a watermark of the virtual section to identify the virtual section in step S1030. If no virtual section is identified, the hybrid virtualization block 730 performs a conventional exception handling in step S1050 and hands over the system control to the OS in step S1055.

Figure 11:
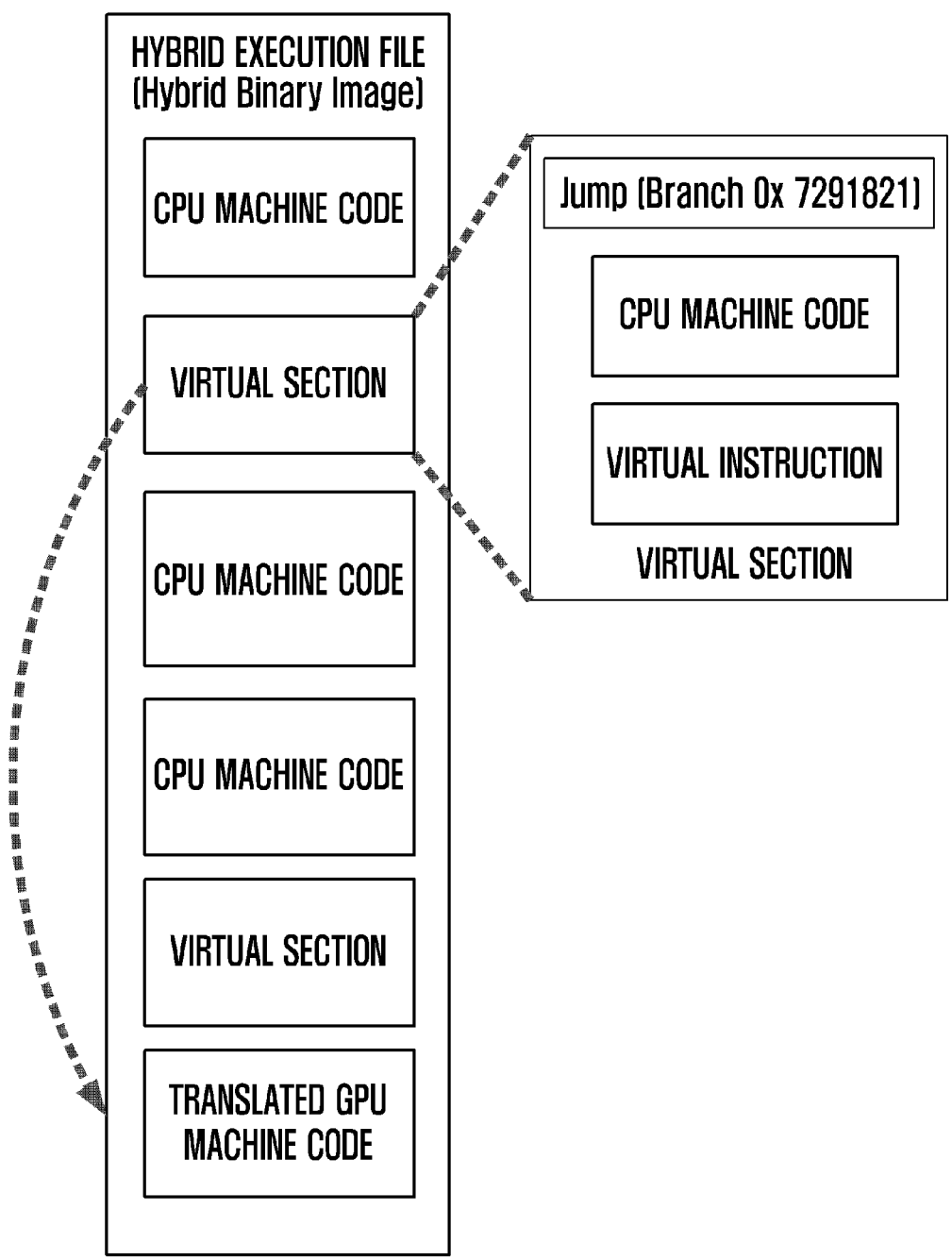
FIG. 11 illustrates a hybrid execution file having GPU machine code according to an embodiment of the present invention.

However, if a virtual section is identified in step S1030, the hybrid virtualization block 730 translates the GPU virtual instruction to a GPU machine code in step S1035. In step S1040, the hybrid virtualization block 730 inserts the translated GPU machine code into the memory (or file) execution region, as illustrated in FIG. 11. In step S1045, the hybrid virtualization block 730 hands over the control to the OS. In step S1070, the OS executes the corresponding GPU machine code using the GPU.

If no exception occurs in step S1020, the OS determines whether a GPU branch is detected in step S1060. If a GPU branch is detected, the OS executes the GPU machine code in step S1070 and, otherwise, the OS executes a CPU machine code in step S1065. Here, the GPU machine code executed through steps S1060 and S1070 is the GPU machine code translated in step S1035 and existing in the memory (or file) that can be executed without an additional translation step.

Figure 12:
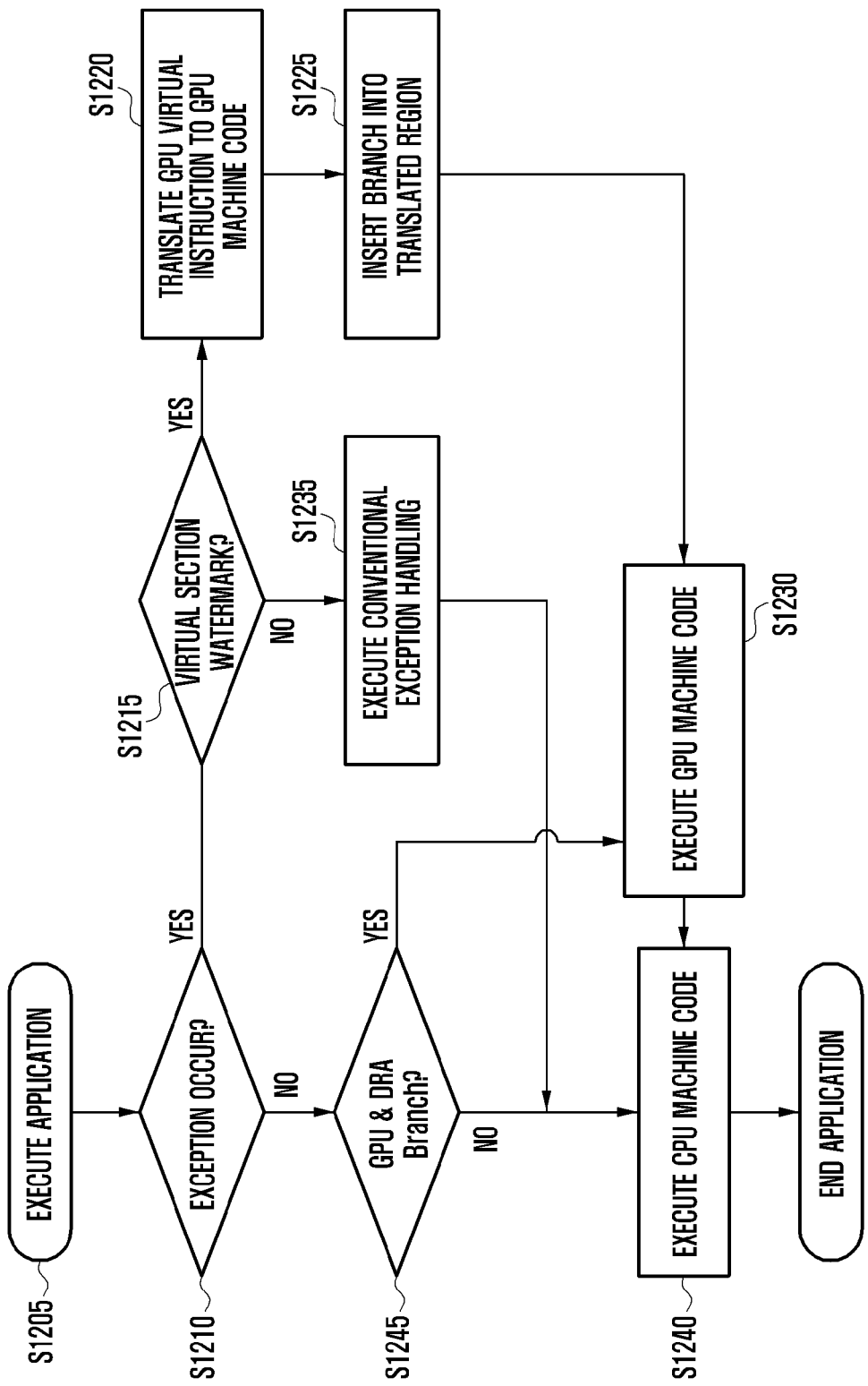
FIG. 12 is a flowchart illustrating a procedure of executing a hybrid execution file by a system OS according to an embodiment of the present invention.

FIG. 12 is a flowchart illustrating a procedure for executing a hybrid execution file by a system OS according to an embodiment of the present invention.

Hereinabove, a description has been provided wherein the hybrid virtualization block 703 of the virtualization layer runs the hybrid execution file. Hereinbelow, a description will be made when an OS runs the hybrid execution file, without introduction of additional virtualization layer, with reference to FIG. 12. Because the compiling process for generating the GPU virtual instruction is identical, regardless of whether the virtualization layer is introduced or not, a detailed description thereon is omitted herein.

Once the hybrid execution file is executed in step S1205, the OS determines if an exception occurs in the CPU in step S1210. If the exception occurs, the OS checks the watermark in the virtual section to identify the virtual section in step S1215. If no virtual section is identified, the OS performs the conventional exception handling in step S1235 and executes the CPU machine code in step S1240).

If a virtual section is identified in step S1215, the OS translates the GPU virtual instruction to a GPU machine code in step S1220, and inserts the translated GPU machine code into the memory (or file) execution region in step S1225, as illustrated in FIG. 11.

In step S1230, the OS executes the corresponding machine code using the GPU.

It no exception occurs in step S1210, the OS determines whether a GPU branch is detected in step S1245. If a GPU branch is detected, the OS executes the GPU machine code in step S1230 and, otherwise, the OS executes the CPU machine code in step S1240. Here, the GPU machine code executed through steps S1245 and S1230 is the GPU machine code translated in step S1220 and existing in the memory (or file) that can be executed without an additional translation step.

Figure 13:
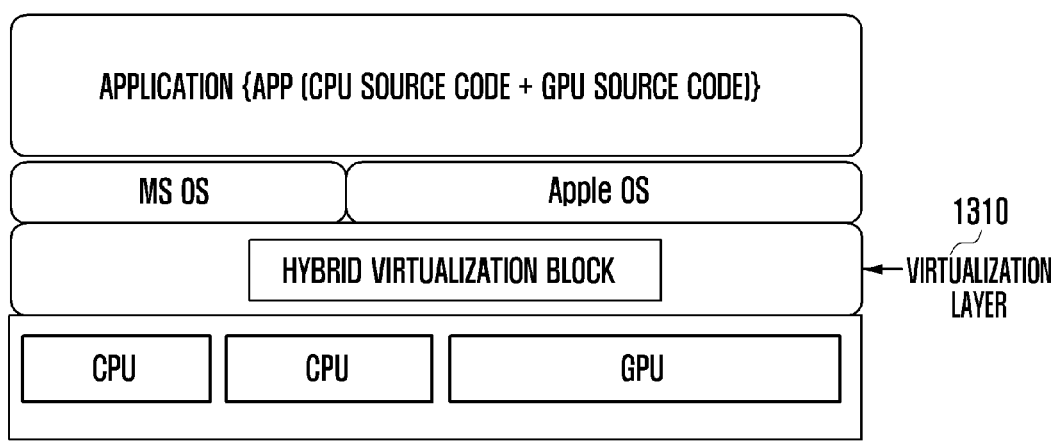
FIG. 13 is a diagram illustrating a system according to an embodiment of the present invention.

As described above, in accordance with an embodiment of the present invention, a GPU translates the GPU virtual instruction into the GPU machine code using a hybrid virtualization block located on a virtualization layer. FIG. 13 illustrates a system according to this embodiment of the present invention.

Referring to FIG. 13, a hybrid virtualization block is included on a virtualization layer 1310, which is arranged below the OS between the application layer and the hardware layer. Using the hybrid virtualization block, the OS recognizes the currently executed hybrid execution file as a conventional execution file. That is, according to an embodiment of the present invention, the GPU virtual instruction can be executed without modification of higher OS.

Figure 14:
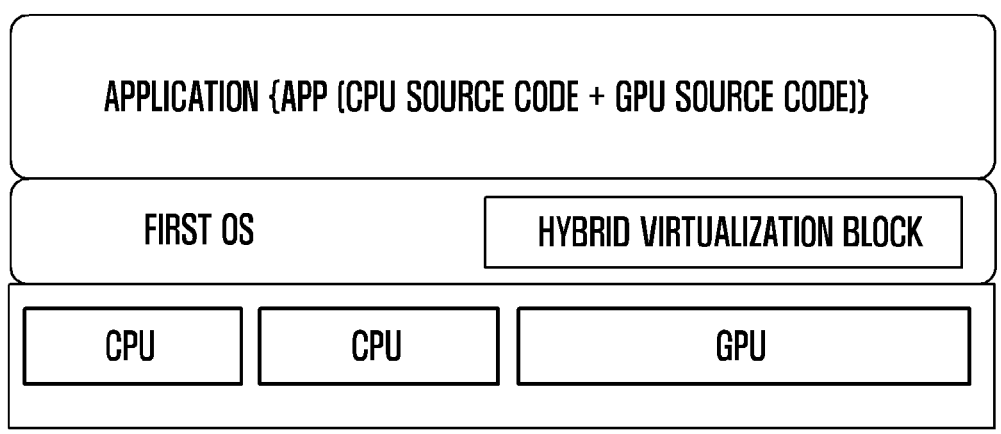
FIG. 14 is a diagram illustrating a system according to another embodiment of the present invention.
Figure 15:
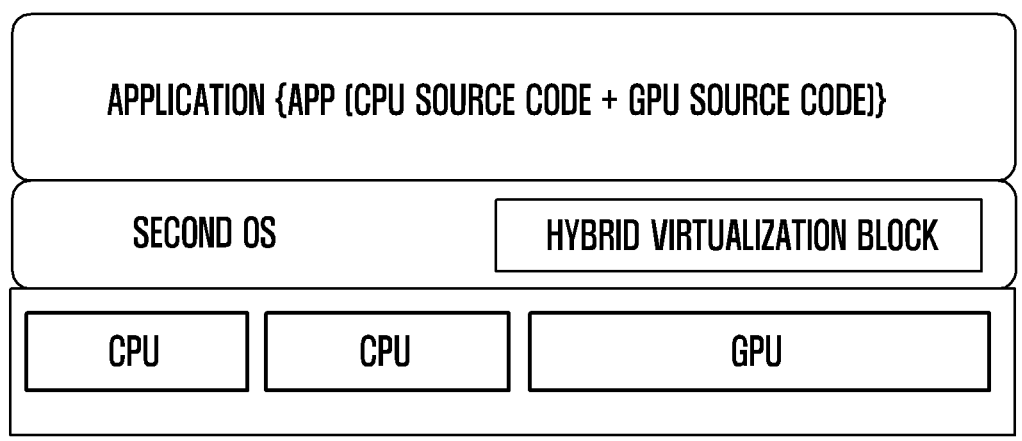
FIG. 15 is a block diagram illustrating a system according to another embodiment of the present invention.

As described above, according to another embodiment of the present invention, an OS translates a GPU virtual instruction into GPU machine code during a runtime. FIGS. 14 and 15 illustrate a system according to this embodiment of the present invention.

Referring to FIGS. 14 and 15, a hybrid virtualization block for executing the hybrid execution file is incorporated in the OS. For example, a first OS, as illustrated in FIG. 14, can be Windows OS® by Microsoft®, and the second OS, as illustrated in FIG. 15, can be OS X® by Apple®. According to this embodiment of the present invention, when an exception occurs, the OS translates GPU virtual instruction into GPU machine code.

As described above, an application execution method and apparatus in accordance with the embodiments of the present invention is capable of efficiently utilizing a CPU and a GPU simultaneously and improving GPU execution efficiency by solving problems of a conventional real time compiling method with a GPU.

The application execution method and apparatus of the present invention compiles GPU source code included in a source code of an application in a GPU virtual instruction and translates the compiled GPU virtual instruction to a GPU machine code, whereby it is possible to improve the utilization efficiency of the CPU and the GPU simultaneously and the GPU running efficiency by compensating for the problem of the real time compiling method for use of GPU.

Also, the application execution method and apparatus of the present invention is capable of preventing the GPU source code from exposure to the outside, resulting in improved security. Further, the application execution method and apparatus of the present invention introduces GPU virtual instructions, which are transparent to hardware, i.e., to be implemented independently without consideration of the GPU hardware manufacturer.

Although certain embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims and any equivalents thereof.

What is claimed is:

1. A method for compiling and executing an application in a system including a Central Processing Unit (CPU) and a Graphic Processing Unit (GPU), the method comprising:
   receiving a request for compiling the application, the application including CPU source code and GPU source code;
   compiling the CPU source code into CPU machine code, and compiling the GPU source code into a GPU virtual instruction;
   generating an execution file by linking the CPU machine code and the GPU virtual instruction in response to the request, the execution file including a virtual section including information relating to CPU execution time and GPU execution time;
   receiving a request for executing the execution file;
   identifying whether to execute the execution file on the CPU or the GPU based on the information relating to the CPU execution time and the GPU execution time; and
   executing the execution file on one of the CPU and the GPU based on a result of identifying whether to execute the execution file on the CPU or the GPU, and
   wherein the executing the execution file further comprises translating the GPU virtual instruction into GPU machine code, and inserting the GPU machine code into the execution file in response to the request for executing the execution file; and
   executing the CPU machine code and the GPU machine code.

2. The method of claim 1, wherein the virtual section includes the CPU machine code and the GPU virtual instruction.

3. The method of claim 2, wherein the virtual section further includes a virtual section header having a watermark for identifying the virtual section, the CPU machine code, and the GPU virtual instruction.

4. The method of claim 2, wherein executing the execution file comprises:
   detecting, by an Operating System (OS) of the system, an exception in the execution file;
   handing over system control to a hybrid virtualization block;
   identifying, by the hybrid virtualization block, the virtual section;
   translating the GPU virtual instruction into the GPU machine code;
   handing over the system control back to the OS; and
   executing, by the OS, the GPU machine code using the GPU.

5. The method of claim 4, wherein the hybrid virtualization block is located on a virtualization layer between an application layer and a hardware layer.

6. The method of claim 2, wherein executing the execution file comprises:
   detecting, by an Operating System (OS) of the system, an exception in the execution file;
   identifying the virtual section;
   translating the GPU virtual instruction into the GPU machine code; and
   executing the GPU machine code using the GPU.

7. The method of claim 1, further comprising:
   placing the GPU machine code in the execution file;
   receiving to a command for executing the GPU virtual instruction; and
   executing the GPU machine code of the execution file, in response to the command.

8. The method of claim 1, wherein the GPU virtual instruction and the GPU machine code are formatted at machine code level.

9. An apparatus for compiling and executing an application including Central Processing Unit (CPU) source code and Graphic Processing Unit (GPU) source code, comprising:
   a hardware device including a CPU and a GPU;
   a compiler that compiles the CPU source code into CPU machine code and compiles the GPU source code into a GPU virtual instruction and generates an execution file by linking the CPU machine code and the GPU virtual instruction in response to a request, the execution file including a virtual section including information relating to CPU execution time and GPU execution time; and
   a hybrid virtualization block configured to identify whether to execute the execution file on the CPU or the GPU based on the information relating to the CPU execution time and the GPU execution time, and execute the execution file on one of the CPU and the GPU based on a result of identifying whether to execute the execution file on the CPU or the GPU,
   wherein the hybrid virtualization block is further configured to translate the GPU virtual instruction into GPU machine code, insert the GPU machine code into the execution file in response to a request for executing the execution file, and execute the CPU machine code and the GPU machine code.

10. The apparatus of claim 9, wherein the hybrid virtualization block is interposed between an application layer and a hardware layer.

11. The apparatus of claim 9, wherein the virtual section includes the CPU machine code and the GPU virtual instruction.

12. The apparatus of claim 11, wherein the virtual section comprises a virtual section header including a watermark for identifying the virtual section, the CPU machine code, and the GPU virtual instruction.

13. The apparatus of claim 11, wherein the hardware device includes an Operating System (OS) that runs the execution file, and hands over system control to the hybrid virtualization block.

14. The apparatus of claim 13, wherein the hybrid virtualization block translates the GPU virtual instruction into the GPU machine code and hands over the system control to the OS.

15. The apparatus of claim 13, wherein the OS places the GPU machine code in the execution file and executes the GPU machine code of the execution file in response to a command for executing the GPU virtual instruction.

16. The apparatus of claim 9, wherein the GPU virtual instruction and the GPU machine code are formatted at machine code level.

17. An apparatus for compiling and executing an application including Central Processing Unit (CPU) source code and Graphic Processing Unit (GPU) source code, comprising:
   a hardware device including a CPU and a GPU;
   a compiler that compiles the CPU source code into CPU machine code and compiles the GPU source code into a GPU virtual instruction and generates an execution file by linking the CPU machine code and the GPU virtual instruction in response to a request, the execution file including a virtual section including information relating to CPU execution time and GPU execution time; and an Operating System (OS) configured to identify whether to execute the execution file on the CPU or the GPU based on the information relating to the CPU execution time and the GPU execution time, and execute the execution file on one of the CPU and the GPU based on a result of identifying whether to execute the execution file on the CPU or the GPU, wherein the OS is further configured to translate the GPU virtual instruction into GPU machine code, insert the GPU machine code into the execution file in response to a request for executing the execution file, and executing the CPU machine code and the GPU machine code.

18. The apparatus of claim 17, wherein the virtual section includes the CPU machine code and the GPU virtual instruction.

19. The apparatus of claim 18, wherein the virtual section comprises a virtual section header including a watermark for identifying the virtual section, the CPU machine code, and the GPU virtual instruction.

20. The apparatus of claim 19, wherein the OS is further configured to place the GPU machine code in the execution file and execute the GPU machine code of the execution file in response to a command for executing the GPU virtual instruction.

21. The apparatus of claim 17, wherein the GPU virtual instruction and the GPU machine code are formatted at machine code level.

* * * * *